US011237958B1

(12) United States Patent
Schatzl et al.

(10) Patent No.: US 11,237,958 B1
(45) Date of Patent: Feb. 1, 2022

(54) LOW OVERHEAD CARDINALITY ESTIMATION FOR INCOMING REFERENCES IN REGIONAL GARBAGE COLLECTION

(71) Applicant: Oracle International Corporation, Redwood Shores, CA (US)

(72) Inventors: Thomas Schatzl, Linz (AT); Erik Duveblad, Täby (SE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/146,135

(22) Filed: Jan. 11, 2021

(51) Int. Cl.
*G06F 12/00* (2006.01)
*G06F 12/02* (2006.01)
*G06F 12/0891* (2016.01)

(52) U.S. Cl.
CPC ...... *G06F 12/0253* (2013.01); *G06F 12/0238* (2013.01); *G06F 12/0891* (2013.01)

(58) Field of Classification Search
CPC ............. G06F 12/0253; G06F 12/0238; G06F 12/0891
See application file for complete search history.

(56) References Cited

U.S. PATENT DOCUMENTS

| 10,664,391 B2 * | 5/2020 | Jang | G06F 12/06 |
| 2016/0163381 A1 * | 6/2016 | Lee | G11C 11/5635 |
| | | | 711/209 |
| 2016/0283369 A1 * | 9/2016 | Hada | G06F 12/0246 |

OTHER PUBLICATIONS

Heule et al., "HyperLogLog in practice: algorithmic engineering of a state of the art cardinality estimation algorithm," EDBT '13: Proceedings of the 16th International Conference on Extending Database Technology, Mar. 2013, pp. 683-692.
JDK 15, Available online at < https://openjdk.java.net/projects/jdk/15/ >, Last updated, Sep. 15, 2020, 2 pages.

* cited by examiner

*Primary Examiner* — Shawn X Gu
(74) *Attorney, Agent, or Firm* — Invoke

(57) ABSTRACT

A garbage collection process, wherein a system, concurrently with execution of a mutator application that modifies a heap memory computes, for each of a plurality of regions in the heap memory, an estimate indicative of a time required to evacuate the respective region. Thereafter, during a garbage collection pause having a particular pause duration, the system selects a candidate subset of memory regions for evacuation. The system merges the estimates indicative of the time required to evacuate each region of the candidate subset and determines a remaining time during the pause. The system may determine that the total estimated evacuation time to evacuate the candidate subset of regions does not exceed the determined first remaining time, and may evacuate each region in the candidate subset of memory regions for evacuation.

20 Claims, 7 Drawing Sheets

US 11,237,958 B1

LOW OVERHEAD CARDINALITY ESTIMATION FOR INCOMING REFERENCES IN REGIONAL GARBAGE COLLECTION

TECHNICAL FIELD

The present disclosure relates to garbage collection. In particular, the present disclosure relates to low overhead cardinality estimation in stop-the-world garbage collection.

BACKGROUND

A compiler converts source code, which is written according to a specification directed to the convenience of the programmer, to machine code (also referred to as "native code" or "object code"). Machine code is executable directly by a physical machine environment. Additionally or alternatively, a compiler converts source code to an intermediate representation (also referred to as "virtual machine code/instructions"), such as bytecode, which is executable by a virtual machine that is capable of running on top of a variety of physical machine environments. The virtual machine instructions are executable by the virtual machine in a more direct and efficient manner than the source code. Converting source code to virtual machine instructions includes mapping source code functionality, according to the specification, to virtual machine functionality, which utilizes underlying resources (such as data structures) of the virtual machine. Often, functionality that is presented in simple terms via source code by the programmer is converted into more complex steps that map more directly to the instruction set supported by the underlying hardware on which the virtual machine resides.

A virtual machine executes an application and/or program by executing an intermediate representation of the source code, such as bytecode. An interpreter of the virtual machine converts the intermediate representation into machine code. As the application is executed, certain memory (also referred to as "heap memory") is allocated for objects created by the program. A garbage collection system may be used to automatically reclaim memory locations occupied by objects that are no longer being used by the application. Garbage collection systems free the programmer from having to explicitly specify which objects to deallocate. However, applications often need to pause while waiting for garbage collection operations to complete.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
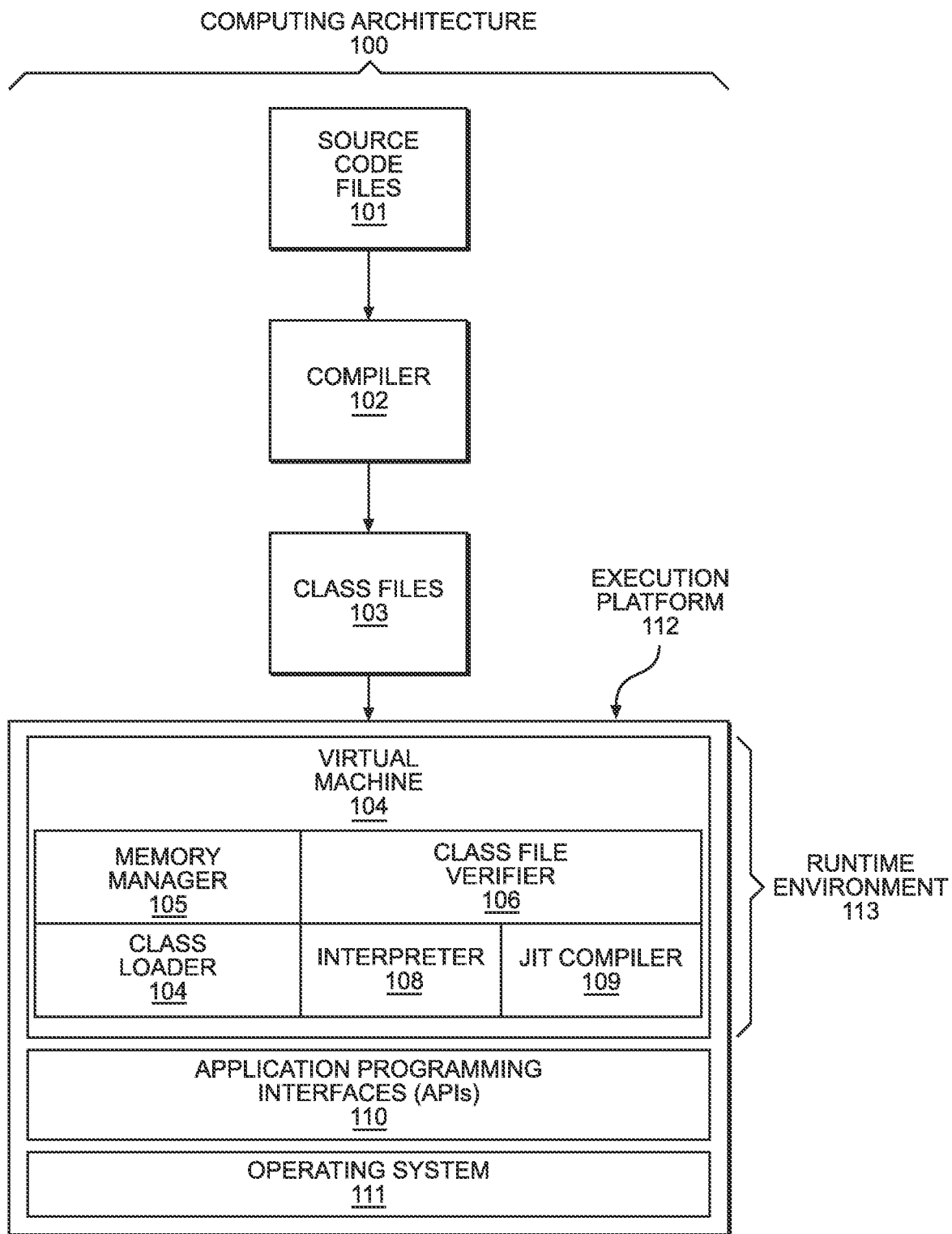
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
    2.1 EXAMPLE CLASS FILE STRUCTURE
    2.2 EXAMPLE VIRTUAL MACHINE ARCHITECTURE
    2.3 LOADING, LINKING, AND INITIALIZING
3. GARBAGE COLLECTION
4. LOW OVERHEAD CARDINALITY ESTIMATION IN STOP-THE-WORLD GARBAGE COLLECTION
5. MISCELLANEOUS; EXTENSIONS
6. HARDWARE OVERVIEW

1. General Overview

One or more embodiments include efficiently using a cardinality estimation algorithm with a stop-the-world garbage collection algorithm to estimate a number of objects (and thus a time required to evacuate memory) in a garbage collection pause. In particular, a program or application (e.g., a mutator) that alters heap memory and a garbage collection algorithm may be executed by a system. The garbage collection algorithm includes an estimation process to estimate a time required to evacuate each region within a heap memory and an evacuation process which reclaims portions of memory that include unused objects. To increase efficiency, portions of the work to be done in the estimation process are moved to occur concurrently with mutator, rather than occurring during the garbage collection pause.

Specifically, a heap memory may be split into multiple memory regions that may potentially be collected during a garbage collection pause. The multiple memory regions may include one or more memory regions that are to be collected during each garbage collections pause (e.g., a young generation) and one or more memory regions that may be collected during a garbage collection pause (e.g., an old generation).

Using stop-the-world garbage collection in an environment providing automatic dynamic memory management, it is beneficial to reduce pause times during which an application (e.g., a mutator) is stopped to reclaim free memory. In particular, the garbage collection pause is typically configured to be below a particular (configurable) threshold (e.g., a pause time goal). During the pause, it is desirable to reclaim as much memory as possible while keeping the pause time goal since there is some additional overhead for stopping the mutator and setting up the garbage collection. Additionally, the mutator application modifies the set of memory still in use (which should not be reclaimed) until the garbage collection pause begins. Accordingly, it is not possible for the program to know an exact memory region that can be reclaimed during the pause prior to stopping the mutator, limiting the amount of possible precomputation that can be performed in parallel with the mutator.

Currently, within a single garbage collection pause, a system may reclaim free memory in steps until the pause time goal is almost exceeded, iteratively coming closer to the pause time goal. Since every step includes some setup overhead, it is desirable to perform the memory reclamation in as large steps as possible, to reduce the step overhead.

To determine the optimal current step size, the system must predict an amount of time the reclamation will take with a high degree of certainty. Increasing accuracy of this prediction may help to minimize the number of steps performed during the garbage collection pause. Also, a more inaccurate prediction requires the garbage collection algorithm to be more conservative, not using the full amount of available time in the garbage collection pause to allow for exceeding the estimate in reclaiming the memory.

An estimation algorithm may, given multiple sets of elements, calculate with a high probability how many unique elements are in the merged set containing allof the unique elements, and thus an amount of time required to evacuate a memory region. However, the estimation algorithms require significant extra per-element work. Accordingly, naively using the estimation algorithms during the pause would be very slow, as the calculation overhead for these algorithms is too high.

Accordingly, the system may split the work required by the estimation algorithm between work that can be done concurrently with the mutator and work that needs to be done in the garbage collection pause to help reduce the computation impact of using the estimation algorithm. In particular, the system may compute per-memory region estimates for each of the memory regions, using the estimation algorithm, in parallel with execution of the mutator and prior to the garbage collection pause. Thereafter, during the garbage collection pause, the system may merge the per-memory region estimates to arrive at a total prediction for evacuating the set of memory regions. This significantly improves the accuracy of the total prediction, allowing for including more memory regions per garbage collection step while still meeting the pause time goal.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
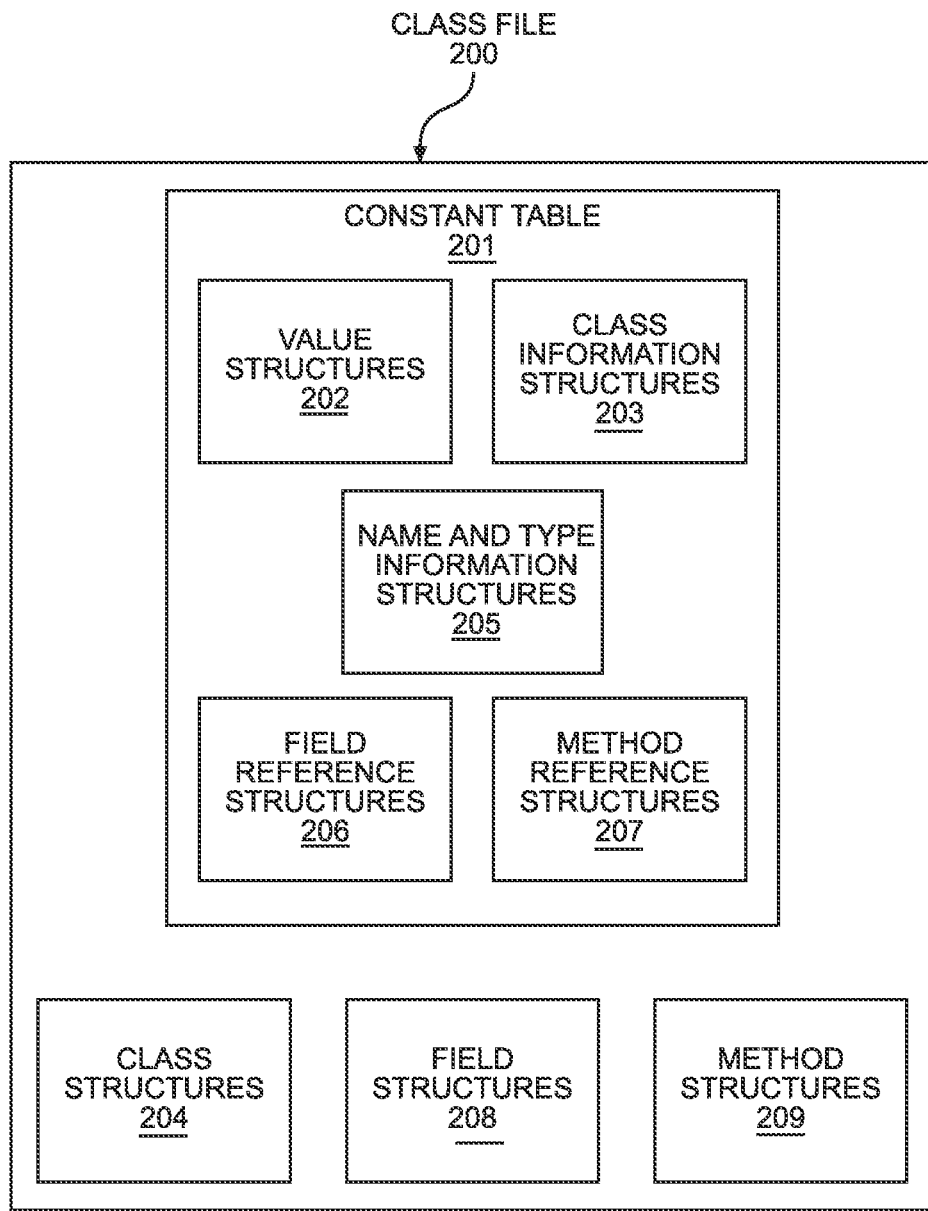
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:
  class A
  {
    int add12and13( ){
      return B.addTwo(12, 13);
    }
  }

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
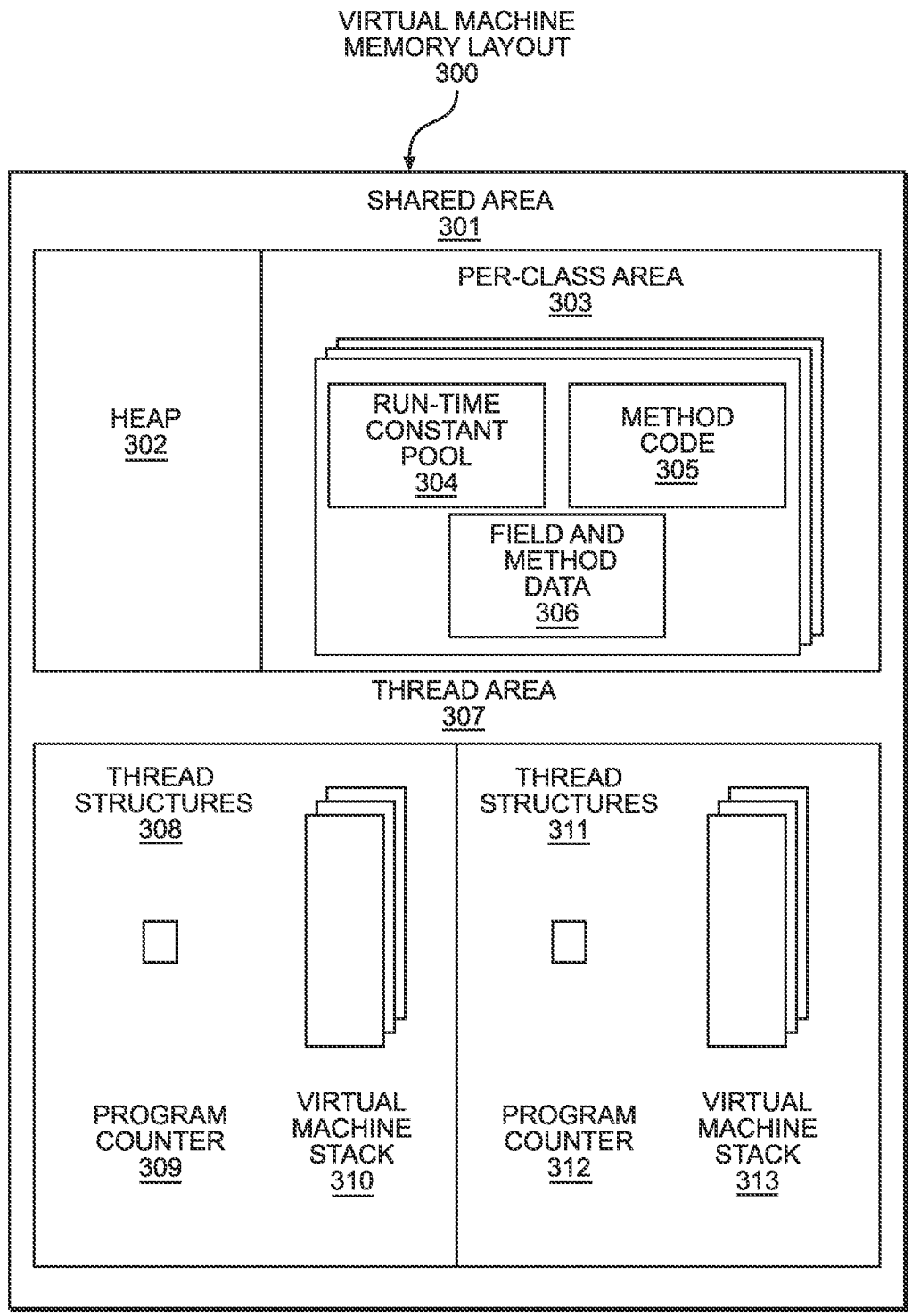
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory region where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory region where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
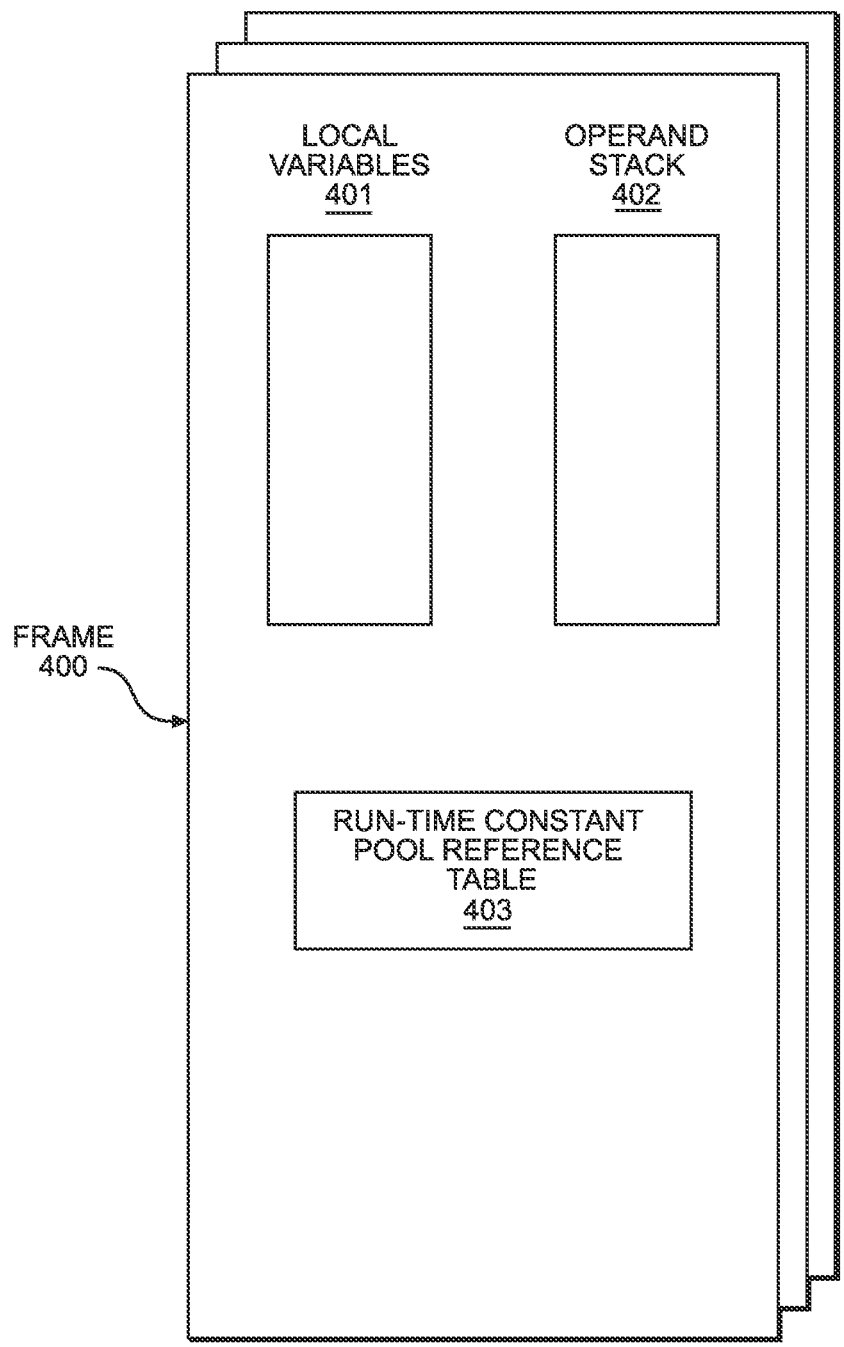
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Garbage Collection

Figure 5:
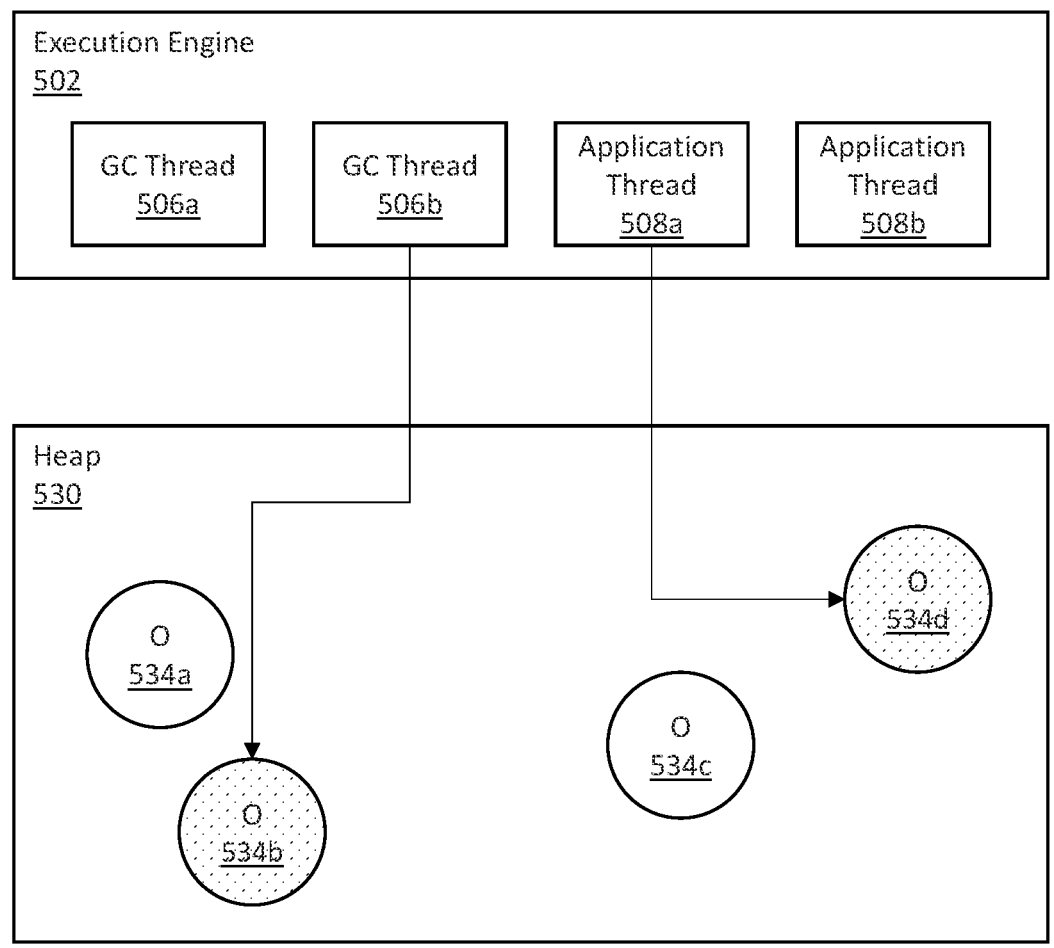
FIG. 5 illustrates an execution engine and a heap memory of a virtual machine according to an embodiment.

FIG. 5 illustrates an execution engine and a heap memory of a virtual machine according to an embodiment. As illustrated in FIG. 5, a system 500 includes an execution engine 502 and a heap 530. The system 500 may include more or fewer components than the components illustrated in FIG. 5. The components illustrated in FIG. 5 may be local to or remote from each other.

In one or more embodiments, a heap 530 represents the run-time data area from which memory for class instances and arrays is allocated. An example of a heap 530 is described above as heap 302 in FIG. 3.

A heap 530 stores objects 534a-d that are created during execution of an application (e.g., a mutator). An object stored in a heap 510 may be a normal object, an object array, or another type of object. A normal object is a class instance. A class instance is explicitly created by a class instance creation expression. An object array is a container object that holds a fixed number of values of a single type. The object array is a particular set of normal objects.

A heap 530 stores live objects 534b, 534d (indicated by the dotted pattern) and unused objects 534a, 534c (also referred to as "dead objects," indicated by the blank pattern). An unused object is an object that is no longer being used by any application. A live object is an object that is still being used by at least one application. An object is still being used by an application if the object is (a) pointed to by a root reference or (b) traceable from another object that is pointed to by a root reference. A first object is "traceable" from a second object if a reference to the first object is included in the second object.

Sample code may include the following:

```
class Person {
    public String name;
    public int age;
    public static void main(String[ ] args){
        Person temp=new Person( );
        temp.name="Sean";
        temp.age=3;
    }
}
```

An application thread 508a executing the above sample code creates an object temp in a heap 530. The object temp is of the type Person and includes two fields. Since the field age is an integer, the portion of the heap 530 that is allocated for temp directly stores the value "3" for the field age. Since the field name is a string, the portion of the heap 530 that is allocated for temp does not directly store the value for the name field; rather the portion of the heap 530 that is allocated for temp stores a reference to another object of the type String. The String object stores the value "Sean." The String object is referred to as being "traceable" from the Person object.

In one or more embodiments, an execution engine 502 includes one or more threads configured to execute various operations. As illustrated, for example, an execution engine 502 includes garbage collection (GC) threads 506a-b and application threads 508a-b.

In one or more embodiments, an application thread 508a-b is configured to perform operations of one or more applications. An application thread 508a-b creates objects during run-time, which are stored onto a heap 530. An application thread 508a-b may also be referred to as a "mutator," because an application thread 508a-b may mutate the heap 530 (during concurrent phases of GC cycles and/or between GC cycles).

In one or more embodiments, a GC thread 506a-b is configured to perform garbage collection. A GC thread 506a-b iteratively performs GC cycles based on a schedule and/or an event trigger (such as when a threshold allocation of a heap (or region thereof) is reached). A GC cycle includes a set of GC operations for reclaiming memory locations in a heap that are occupied by unused objects.

In an embodiment, multiple GC threads 506a-b may perform GC operations in parallel. The multiple GC threads 506a-b working in parallel may be referred to as a "parallel collector."

In an embodiment, GC threads 506a-b may perform at least some GC operations concurrently with the execution of application threads 508a-b. The GC threads 506a-b that operate concurrently with application threads 508a-b may be referred to as a "concurrent collector" or "partially-concurrent collector."

In an embodiment, GC threads 506a-b may perform generational garbage collection. A heap is separated into multiple regions. A first set of the multiple regions (which may be referred to as a "young generation space") stores objects that have not yet satisfied a criteria for being promoted from the first set of regions to a second set of regions. The second set of regions (which may be referred to as an "old generation space") stores objects that have satisfied the criteria for being promoted from the first region to the second region. For example, when a live object survives at least a threshold number of GC cycles, the live object is promoted from the young generation space to the old generation space.

A simple stop-the-world garbage collector may completely halt (e.g., pause) execution of the mutator application to run a collection cycle. Pausing execution of the mutator allows the garbage collector to guarantee that new objects are not allocated, and existing objects do not become unreachable while the garbage collector is running. However, the application can perform no useful work during the garbage collection pause while the garbage collector is running. Advantages of stop-the-world garbage collection include that it is both simpler to implement and faster than other garbage collection types, such as incremental garbage collection.

In the field of stop-the-world garbage collection in an environment providing automatic dynamic memory management it is desirable to keep pause times when the mutator application is paused to reclaim free memory below a particular threshold pause time goal. In this case the system seeks to reclaim as much as possible memory within one garbage collection pause while keeping the pause time goal since there is some additional overhead for stopping the mutator and setting up the garbage collection.

Because the mutator application modifies the set of memory still in use (which should not be reclaimed) during operation (e.g., until the garbage collection pause begins) the system is not able to determine the exact memory regions you can reclaim in advance of the garbage collection pause, limiting the amount of possible precomputation in parallel to the mutator.

Within a single garbage collection pause, the system may reclaim free memory in iterative steps until the pause time goal is almost exceeded. Since each step has some setup overhead, it is desirable to perform memory reclamation in as large steps as possible without exceeding the threshold pause time.

To determine a step size, the system predicts an amount of time the memory reclamation will take. It is desirable that the prediction be as accurate as possible to minimize the number of steps, as calculating the prediction also takes time which would otherwise be available for actual evacuation work. The prediction for a single memory region consists of the sum of time predictions of one or more components of work for that memory region. To determine the total prediction for the current a set of memory regions to garbage collect, these per-memory region predictions are simply added together. The problem with one significant component of work during garbage collection, finding references that are being evacuated, is that the predictions for evacuating multiple memory regions during a single garbage collection step do not account for work that one or more memory regions share and actually needs to be done only once. This leads to multiple counting of the same upcoming work. Since finding references is one of the most time consuming parts of the garbage collection pause, this has a large impact on estimations.

Accordingly, it is necessary to account for the duplicate references when estimating the amount of time memory reclamation will take. In some embodiments, the system may rely on previous experience for duplicate correction by calculating and applying a correction factor associated with a number of duplicate references encountered during previous garbage collection pauses. However, this correction factor may be off by a significant amount (e.g., because different kinds of memory regions are covered by the correction factor, both spatially and temporally). This makes these results very unreliable (under- and over-estimating a lot).

In other embodiments, an estimation algorithm, given multiple sets of elements, can be used to calculate with a high probability a number of unique elements in a merged set containing all of the unique elements. However, the estimation algorithms require significant extra per-element work. Accordingly, naively using the estimation algorithms in the garbage collection pause would be very slow, as the calculation overhead for these algorithms is high.

One example of an estimation algorithm is the "HyperLogLog" algorithm. The HyperLogLog algorithm approximates a number of distinct elements in a multiset. Calculating the exact cardinality of a multiset requires an amount of memory proportional to the cardinality, which is impractical for very large data sets such as the set of elements (e.g., objects) in use in a heap memory. Probabilistic cardinality estimators, such as the HyperLogLog algorithm, use significantly less memory than calculating the exact cardinality, at the cost of obtaining only an approximation of the cardinality. The HyperLogLog algorithm is able to estimate cardinalities of greater than $10^9$ with a typical accuracy (standard error) of 2%, using approximately 1.5 kB of memory.

4. Low Overhead Cardinality Estimation in Stop-the-World Garbage Collection

Figure 6:
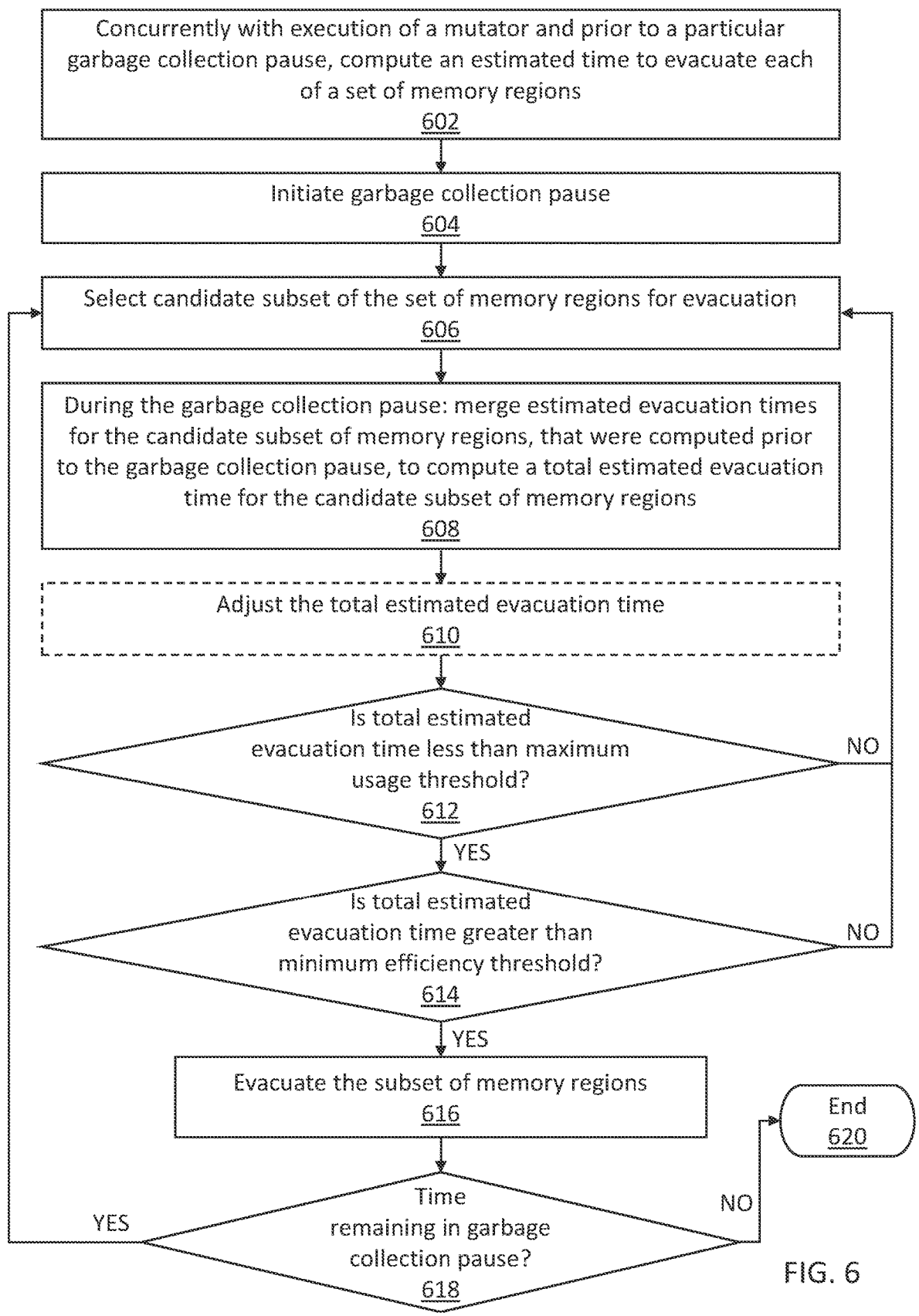
FIG. 6 a method of low overhead cardinality estimation in garbage collection according to an embodiment.

FIG. 6 illustrates an example set of operations for reducing overhead when estimating cardinality in a stop-the-world garbage collection process. One or more operations illustrated in FIG. 6 may be modified, rearranged, or omitted all together. Accordingly, the particular sequence of operations illustrated in FIG. 6 should not be construed as limiting the scope of one or more embodiments.

A system can execute a mutator application. The mutator application may be any application that is capable of writing to a memory heap associated with executing applications. The heap may include multiple regions, including at least a set of one or more regions indicated as a young generation space and one or more regions indicated as an old generation space. The young generation space may include a set of one or more regions that are evacuated each time the system performs a garbage collection process. The old generation space may include a set of one or more memory regions of the heap that may be considered for evacuation during a garbage collection process.

Concurrently with execution of the mutator application, the system may compute estimates for evacuating each region of the heap (Operation 602). The estimates may be computed by executing a probabilistic cardinality estimation algorithm using a list of elements that reference. Examples of probabilistic cardinality estimation algorithms include, for example, the HyperLogLog algorithm, the LogLog algorithm, and the Flajolet-Martin algorithm. Us of an estimation algorithm, given a set of elements in a particular memory region, may estimate with a high probability a number of unique elements in a merged set that includes the particular memory region. However, the estimation algorithms require significant extra per-element work. Accordingly, applying the estimation algorithms prior to the garbage collection pause helps to reduce overhead in the pause, improving memory evacuation efficiency during the garbage collection pause.

In embodiments, the overhead of executing the cardinality estimates may be reduced by executing the estimation algorithms continuously in parallel with the mutator algorithm, such that, each time a new element that refers to a memory location in a particular region is added to the heap, an updated estimate of the evacuation time of the particular region is calculated.

In some embodiments, when multiple particular memory regions are known to always be evacuated together, the system may compute a single estimate for evacuation of all regions known to be collected together. As a particular example, the set of memory regions known as the young generation space are known to all be evacuated during each garbage collection operation. Accordingly, the system may calculate a single estimate for evacuation of all regions in the young generation space, rather than separately calculating an estimate for each region in the young generation space.

In some embodiments, the system may monitor heap memory regions to determine whether at least portions of two or more particular memory regions are substantially duplicated. When two or more memory regions include portions are substantially duplicated, the system may determine that a single intermediate estimate can be used for each of the duplicated memory regions.

In some embodiments, the system may monitor heap memory regions to determine that overlap of references within the memory regions is high. This information may be useful in selecting regions to be evacuated concurrently during a garbage collection pause.

After preparing the estimates for each memory region, the system may initiate a garbage collection pause (Operation 604). In addition to completion of computing the memory regions' estimated evacuation times, initiating the garbage collection pause may be based on one or more of heap memory utilization, size of the heap, and/or time since the previous garbage collection operation. The garbage collection pause may have a fixed duration that is configurable based on system and/or user input. The garbage collection pause is typically on the order of milliseconds, but may extend longer depending on the size of the heap and/or the frequency with which garbage collection processes are executed. During a garbage collection pause, the mutator application is temporarily halted such that no new elements are added to the heap and no elements stored within the heap become unreachable.

During the garbage collection pause, the system may select a candidate subset of memory regions for evacuation during the garbage collection pause (Operation 606). In embodiments, the candidate subset of memory regions may include the young generation space (e.g., if the young generation space has not been evacuated during the current garbage collection operation). In embodiments one or more regions of the old generation space may be included in the candidate subset of memory regions to be evacuated. The one or more regions of the old generation space may be selected based on time since the one or more regions were last evacuated, similarity to one or more other regions within the candidate subset of memory regions to be evacuated, amount of changes to the region since the last garbage collection pause, and/or length of the estimated time to evacuate the region computed prior to the garbage collection pause.

Additionally, during the garbage collection pause, the system may merge the estimated evacuation times associated with the memory regions in the candidate subset of memory regions for evacuation (Operation 608). As noted previously, each of the estimated evacuation times was previously calculated prior to initiating the garbage collection pause. In embodiments, a total estimated evacuation time may be calculated based on execution of a merging function on the set of estimated evacuation times associated with the candidate subset of memory regions for evacuation. For example, the merging function may include a simple arithmetic addition of the estimated evacuation times.

The system may adjust the total estimated evacuation time (Operation 610). In some embodiments, the total estimated evacuation time may be adjusted based at least in part on the fact that it is not necessary to consider work to be done in memory regions that are being currently collected, or memory regions that have already been collected during the current garbage collection operation. As a particular example, the total estimated evacuation time may be adjusted by reducing the total estimated evacuation time based on a ratio of a number of memory regions that are currently being evacuated or have already been evacuated during the current garbage collection operation to total number of available memory regions in use. As another example, the system may adjust the total estimated evacuation time based on previous experience for duplicate correction by calculating and applying a correction factor associated with a number of duplicate references encountered during previous garbage collection pauses.

The system may compare the total estimated evacuation time to a remaining time in the garbage collection pause (Operation 612) to determine if the candidate subset of memory regions for evacuation during the garbage collection pause should be adjusted. In particular, if the total estimated evacuation time exceeds a maximum usage threshold, the system may determine that there is insufficient time remaining in the garbage collection pause to evacuate the candidate subset of memory regions for evacuation. In some embodiments, the maximum usage threshold may be the time remaining in the garbage collection pause. In other embodiments, the maximum usage threshold may be a percentage (e.g., 90%, 80%, 75%, etc.) of the time remaining in the garbage collection pause. That is, the remaining time in the garbage collection pause may be reduced by a factor to help ensure that, even if the total estimated evacuation time is less than the actual time required to evacuated the selected candidate subset of memory regions, the system will still be able to complete the evacuation within the garbage collection pause. If the total estimated evacuation time is greater than the maximum usage threshold (NO in Operation 612), the system may return to Operation 606 to make adjustments to the selected a candidate subset of memory regions for evacuation to reduce the number of memory regions included in the candidate subset.

If the total estimated evacuation time is less than the maximum usage threshold (YES in Operation 612), the system may also compare the total estimated evacuation time to a minimal efficiency threshold based on the remaining time in the garbage collection pause (Operation 614). The minimal efficiency threshold may represent a minimum amount of time to be used during the garbage collection step. For example, the minimal efficiency threshold may be a relatively lower percentage (e.g., 40%, 45%, 50%) of the time remaining in the garbage collection pause. If the total estimated evacuation time is less than the minimal efficiency threshold (NO in Operation 614), the system may return to Operation 606 to make adjustments to the selected a candidate subset of memory regions for evacuation to increase the number of memory regions included in the candidate subset.

If the total estimated evacuation time is greater than the minimal efficiency threshold (YES in Operation 614), the system may evacuate the candidate subset of memory regions for evacuation (Operation 616). In embodiments, evacuating the subset of memory regions may include copying live objects found within the subset of memory regions into a particular target memory region that is not within the subset of memory regions. This copying process compacts the live objects and frees space within the selected subset of memory regions. Additionally, evacuation may include correcting any references to the copied objects to maintain the existing relationships between objects in the heap.

Following evacuation and still during the garbage collection pause, the system may determine if the remaining time in the garbage collection pause exceeds a new garbage collection step threshold (Operation 618). The new garbage collection step threshold may represent a minimum amount of time the system requires to complete a new garbage collection step within the current garbage collection pause. As a particular example, the new garbage collection step threshold may be an absolute time value (e.g., 1 millisecond). Alternatively, the new garbage collection step threshold may be a percentage (e.g., 20%, 25%, 33%) of the garbage collection pause duration. If the system determines that the remaining time in the garbage collection pause exceeds the new garbage collection step threshold (YES in Operation 618), the system may return to Operation 606 to select a new candidate subset of memory regions for evacuation based on the already-collected set of memory regions and the time remaining in the garbage collection pause.

Alternatively, if the system determines that the remaining time in the garbage collection pause does not exceed the new garbage collection step threshold (NO in Operation 618), the system may end the garbage collection operation (Operation 620). In embodiments, ending the garbage collection operation may include resuming execution of the mutator application.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
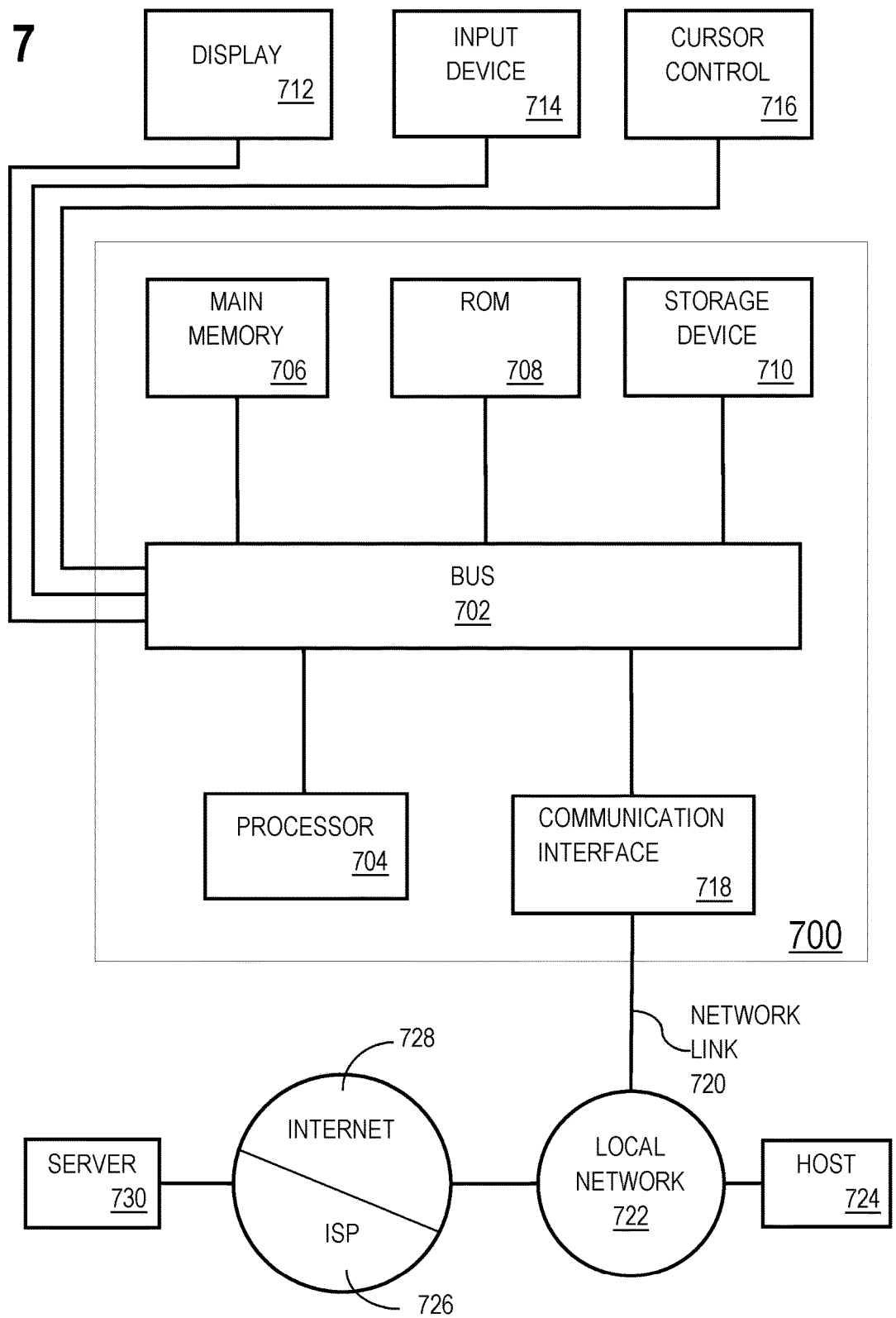
FIG. 7 illustrates a system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:

concurrently with execution of a mutator application that modifies a heap memory comprising a plurality of memory regions and prior to initiating a garbage collection pause to perform a garbage collection operation:

for each of the plurality of regions in the heap memory, computing an estimate indicative of a time required to evacuate the respective region by applying a probabilistic cardinality estimator algorithm to the region to estimate a number of unique objects present within a set that includes the region;

during the garbage collection pause having a particular pause duration:
selecting, from the plurality of memory regions in the heap memory, a candidate subset of memory regions for evacuation, the candidate subset being selected based at least in part on the particular pause duration and the estimates computed prior to the garbage collection pause;
merging the estimates that (a) correspond to the selected candidate subset of memory regions and (b) are computed prior to the garbage collection pause to determine a total estimated evacuation time to evacuate the candidate subset of memory regions;
determining a first remaining time during the pause;
determining that the total estimated time to evacuate the candidate subset of regions does not exceed the determined first remaining time; and
evacuating each region in the candidate subset of memory regions for evacuation.

2. The medium of claim 1, wherein selecting the candidate subset of regions for evacuation comprises:
determining a remaining time during the pause;
selecting the candidate subset of regions for evacuation such that a total of intermediate estimates for each region in the subset is less than the determined remaining time.

3. The medium of claim 1, the operations further comprising:
after evacuating each region in the candidate subset of memory regions for evacuation:
determining a second remaining time during the pause;
selecting a second candidate subset of regions for evacuation, the second candidate subset of memory regions for evacuation being selected based at least in part on the determined second remaining time and computed intermediate estimates for the second candidate subset of regions for evacuation;
merging the estimates that (a) correspond to the second candidate subset of memory regions and (b) are computed prior to the garbage collection pause to determine a second total estimated evacuation time to evacuate the second candidate subset of memory regions;
determining that the second total estimated evacuation time to evacuate the second candidate subset of regions does not exceed the determined second remaining time; and
evacuating each region in the second candidate subset of memory regions for evacuation.

4. The medium of claim 1, wherein selecting the candidate subset of memory regions for evacuation further comprises selecting a plurality of regions for inclusion in the candidate subset of memory regions based on an amount of overlap of references within the plurality of regions.

5. The medium of claim 1, wherein the probabilistic cardinality estimator algorithm is a HyperLogLog algorithm.

6. The medium of claim 1, the operations further comprising:
adjusting the total estimated evacuation time to evacuate the candidate subset of regions based on a ratio of a number memory regions that are evacuated and a total number of memory regions in the memory heap.

7. The medium of claim 1, wherein the operations further comprise:
determining that the total estimated evacuation time to evacuate the candidate subset of regions exceeds an efficiency threshold.

8. A method comprising:
concurrently with execution of a mutator application that modifies a heap memory comprising a plurality of memory regions and prior to initiating a garbage collection pause to perform a garbage collection operation:
for each of the plurality of regions in the heap memory, computing an estimate indicative of a time required to evacuate the respective region by applying a probabilistic cardinality estimator algorithm to the region to estimate a number of unique objects present within a set that includes the region;
during the garbage collection pause having a particular pause duration:
selecting, from the plurality of memory regions in the heap memory, a candidate subset of memory regions for evacuation, the candidate subset being selected based at least in part on the particular pause duration and the estimates computed prior to the garbage collection pause;
merging the estimates that (a) correspond to the selected candidate subset of memory regions and (b) are computed prior to the garbage collection pause to determine a total estimated evacuation time to evacuate the candidate subset of memory regions;
determining a first remaining time during the pause;
determining that the total estimated evacuation time to evacuate the candidate subset of regions does not exceed the determined first remaining time; and
evacuating each region in the candidate subset of memory regions for evacuation;
wherein the method is performed by at least one device including a hardware processor.

9. The method of claim 8, wherein selecting the candidate subset of regions for evacuation comprises:
determining a remaining time during the pause;
selecting the candidate subset of regions for evacuation such that a total of intermediate estimates for each region in the subset is less than the determined remaining time.

10. The method of claim 8, further comprising:
after evacuating each region in the candidate subset of memory regions for evacuation:
determining a second remaining time during the pause;
selecting a second candidate subset of regions for evacuation, the second candidate subset of memory regions for evacuation being selected based at least in part on the determined second remaining time and computed intermediate estimates for the second candidate subset of regions for evacuation;
merging the estimates that (a) correspond to the second candidate subset of memory regions and (b) are computed prior to the garbage collection pause to determine a second total estimated evacuation time to evacuate the candidate subset of memory regions;
determining that the second total estimated evacuation time to evacuate the second candidate subset of regions does not exceed the determined second remaining time; and
evacuating each region in the second candidate subset of memory regions for evacuation.

11. The method of claim 8, wherein computing an intermediate estimate indicative of a time required to evacuate a region comprises:
  determining that multiple particular memory regions are known to always be evacuated together; and
  computing a single estimate for evacuation of the multiple regions known to be evacuated together;
  and wherein selecting the candidate subset of memory regions for evacuation comprises selecting the multiple particular memory regions.

12. The method of claim 8, wherein the probabilistic cardinality estimator algorithm is a HyperLogLog algorithm.

13. The method of claim 8, further comprising:
  adjusting the total estimated evacuation time to evacuate the candidate subset of regions based on a ratio of a number memory regions that are evacuated and a total number of memory regions in the memory heap.

14. The method of claim 8, further comprising:
  determining that the total estimated evacuation time to evacuate the candidate subset of regions exceeds an efficiency threshold.

15. A system comprising:
  at least one device including a hardware processor;
  the system being configured to perform operations comprising:
  concurrently with execution of a mutator application that modifies a heap memory comprising a plurality of memory regions and prior to initiating a garbage collection pause to perform a garbage collection operation:
    for each of the plurality of regions in the heap memory, computing an estimate indicative of a time required to evacuate the respective region by applying a probabilistic cardinality estimator algorithm to the region to estimate a number of unique objects present within a set that includes the region;
  during the garbage collection pause having a particular pause duration:
    selecting, from the plurality of memory regions in the heap memory, a candidate subset of memory regions for evacuation, the candidate subset being selected based at least in part on the particular pause duration and the estimates computed prior to the garbage collection pause;
    merging the estimates that (a) correspond to the selected candidate subset of memory regions and (b) are computed prior to the garbage collection pause to determine a total estimated evacuation time to evacuate the candidate subset of memory regions;
    determining a first remaining time during the pause;
    determining that the total estimated evacuation time to evacuate the candidate subset of regions does not exceed the determined first remaining time; and
    evacuating each region in the candidate subset of memory regions for evacuation.

16. The system of claim 15, wherein selecting the candidate subset of regions for evacuation comprises:
  determining a remaining time during the pause;
  selecting the candidate subset of regions for evacuation such that a total of intermediate estimates for each region in the subset is less than the determined remaining time.

17. The system of claim 15, the operations further comprising:
  after evacuating each region in the candidate subset of memory regions for evacuation:
    determining a second remaining time during the pause;
    selecting a second candidate subset of regions for evacuation, the second candidate subset of memory regions for evacuation being selected based at least in part on the determined second remaining time and computed intermediate estimates for the second candidate subset of regions for evacuation;
    merging the estimates that (a) correspond to the second candidate subset of memory regions and (b) are computed prior to the garbage collection pause to determine a second total estimated evacuation time to evacuate the candidate subset of memory regions;
    determining that the second total estimated evacuation time to evacuate the second candidate subset of regions does not exceed the determined second remaining time; and
    evacuating each region in the second candidate subset of memory regions for evacuation.

18. The system of claim 15, wherein the probabilistic cardinality estimator algorithm is a HyperLogLog algorithm.

19. The system of claim 15, the operations further comprising:
  adjusting the total estimated evacuation time to evacuate the candidate subset of regions based on a ratio of a number memory regions that are evacuated and a total number of memory regions in the memory heap.

20. The system of claim 15, the operations further comprising:
  determining that the total estimated evacuation time to evacuate the candidate subset of regions exceeds an efficiency threshold.

\* \* \* \* \*

UNITED STATES PATENT AND TRADEMARK OFFICE
CERTIFICATE OF CORRECTION

PATENT NO. : 11,237,958 B1
APPLICATION NO. : 17/146135
DATED : February 1, 2022
INVENTOR(S) : Schatzl et al.

Page 1 of 1

It is certified that error appears in the above-identified patent and that said Letters Patent is hereby corrected as shown below:

In the Specification

In Column 3, Line 24, delete "allof" and insert -- all of --, therefor.

In the Claims

In Column 21, Line 26, in Claim 2, delete "medium" and insert -- media --, therefor.

In Column 21, Line 33, in Claim 3, delete "medium" and insert -- media --, therefor.

In Column 21, Line 56, in Claim 4, delete "medium" and insert -- media --, therefor.

In Column 21, Line 61, in Claim 5, delete "medium" and insert -- media --, therefor.

In Column 21, Line 64, in Claim 6, delete "medium" and insert -- media --, therefor.

In Column 22, Line 1, in Claim 6, delete "number memory" and insert -- number of memory --, therefor.

In Column 22, Line 3, in Claim 7, delete "medium" and insert -- media --, therefor.

Signed and Sealed this
Fifth Day of July, 2022

*Katherine Kelly Vidal*

Katherine Kelly Vidal
*Director of the United States Patent and Trademark Office*